(12) United States Patent
Yue et al.

(10) Patent No.: US 11,281,860 B2
(45) Date of Patent: Mar. 22, 2022

(54) METHOD, APPARATUS AND DEVICE FOR RECOGNIZING TEXT TYPE

(71) Applicant: BAIDU ONLINE NETWORK TECHNOLOGY (BEIJING) CO., LTD., Beijing (CN)

(72) Inventors: Aizhen Yue, Beijing (CN); Yan Cui, Beijing (CN); Hui Zhao, Beijing (CN); Xian Gao, Beijing (CN); Sijiang Wang, Beijing (CN); Jing Tan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 152 days.

(21) Appl. No.: 16/160,950

(22) Filed: Oct. 15, 2018

(65) Prior Publication Data
US 2019/0050396 A1    Feb. 14, 2019

Related U.S. Application Data

(63) Continuation of application No. PCT/CN2016/108421, filed on Dec. 2, 2016.

(30) Foreign Application Priority Data

Aug. 31, 2016    (CN) .......................... 201610798213.2

(51) Int. Cl.
*G06F 40/30* (2020.01)
*G06F 40/279* (2020.01)
(52) U.S. Cl.
CPC ............ *G06F 40/30* (2020.01); *G06F 40/279* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 8,892,550 B2 * 11/2014 Chu-Carroll ........ G06F 16/3325
707/728
9,378,295 B1 * 6/2016 Marra ..................... G06F 16/35
(Continued)

FOREIGN PATENT DOCUMENTS

CN    101059796 A    10/2007
CN    103473309 A    12/2013
(Continued)

OTHER PUBLICATIONS

Isa et al., Text Document Preprocessing with the Bayes Formula for classification using the Support Vector Machine, 2008, IEEE Transactions on Knowledge and Data engineering, vol. 20, pp. 1264-1272. (Year: 2008).*
(Continued)

*Primary Examiner* — Lamont M Spooner
(74) *Attorney, Agent, or Firm* — Marshall, Gerstein & Borun LLP (57) ABSTRACT

The present disclosure discloses a method and apparatus for recognizing a text type, and a device. A specific embodiment of the method comprises: preprocessing a pre-acquired text to obtain a keyword set of the text; calculating an occurrence probability value of each keyword in the keyword set in the text; importing, for the each keyword in the keyword set, the keyword and the occurrence probability value corresponding to the keyword into a pre-established document topic generation model, and determining an occurrence probability value of each topic in the text preset in the document topic generation model; and recognizing a type to which the text belongs based on the occurrence probability value of the (Continued)

each topic in the text. The embodiment improves an accuracy of recognizing the type of the text.

11 Claims, 6 Drawing Sheets

(56) References Cited

U.S. PATENT DOCUMENTS

| | | | |
|---|---|---|---|
| 9,881,255 B1* | 1/2018 | Castellanos | G06F 16/9574 |
| 10,025,773 B2* | 7/2018 | Bordawekar | G06F 40/284 |
| 10,373,067 B1* | 8/2019 | Chen | G06F 16/24578 |
| 10,510,013 B2* | 12/2019 | Yuan | G06F 40/205 |
| 10,606,705 B1* | 3/2020 | Janakiraman | G06F 11/1451 |
| 2005/0267869 A1* | 12/2005 | Horvitz | G06Q 30/0256 |
| 2006/0212288 A1* | 9/2006 | Sethy | G10L 15/18 704/10 |
| 2007/0203885 A1 | 8/2007 | Kim et al. | |
| 2010/0278428 A1* | 11/2010 | Terao | G06F 16/345 382/177 |
| 2011/0208750 A1* | 8/2011 | Miyazaki | G06F 16/907 707/748 |
| 2012/0096029 A1* | 4/2012 | Tamura | G06F 40/279 707/772 |
| 2012/0239668 A1* | 9/2012 | Bhattacharyya | G06F 40/30 707/754 |
| 2012/0254255 A1* | 10/2012 | Jeong | G06F 16/2465 707/802 |
| 2013/0159254 A1* | 6/2013 | Chen | G06F 16/9535 707/639 |
| 2013/0163860 A1* | 6/2013 | Suzuki | G06K 9/00718 382/159 |
| 2013/0183022 A1* | 7/2013 | Suzuki | G06K 9/00718 386/241 |
| 2013/0273976 A1* | 10/2013 | Rao | H04L 12/1822 455/563 |
| 2014/0108376 A1* | 4/2014 | Batali | G06F 16/9535 707/708 |
| 2014/0149417 A1* | 5/2014 | Kim | G06F 16/335 707/740 |
| 2014/0257795 A1* | 9/2014 | Birnbaum | G06Q 30/02 704/9 |
| 2015/0248476 A1* | 9/2015 | Weissinger | H04L 65/60 707/737 |
| 2015/0286710 A1* | 10/2015 | Chang | G06F 16/36 706/12 |
| 2015/0317303 A1* | 11/2015 | Zhang | G06F 40/40 707/776 |
| 2016/0155069 A1* | 6/2016 | Hoover | G06F 16/26 706/12 |
| 2016/0171386 A1* | 6/2016 | Brun | G06F 40/211 706/12 |
| 2016/0179966 A1* | 6/2016 | Park | G06F 16/9535 707/728 |
| 2016/0196292 A1* | 7/2016 | Munakata | G06F 16/35 707/738 |
| 2016/0314207 A1* | 10/2016 | Huang | G06F 16/958 |
| 2017/0024466 A1* | 1/2017 | Bordawekar | G06F 40/216 |
| 2017/0075978 A1* | 3/2017 | Zhang | G06F 40/216 |
| 2017/0075991 A1* | 3/2017 | Kataria | G06F 16/337 |
| 2017/0255536 A1* | 9/2017 | Weissinger | G06Q 50/01 |
| 2017/0262448 A1* | 9/2017 | Paulsen | G06F 16/24578 |
| 2017/0300966 A1* | 10/2017 | Dereszynski | G06Q 30/0254 |
| 2018/0018316 A1* | 1/2018 | Bogdan | G06F 16/355 |
| 2018/0053116 A1* | 2/2018 | Cai | G06F 16/353 |
| 2018/0212986 A1* | 7/2018 | Shen | H04B 1/38 |
| 2018/0260387 A1* | 9/2018 | Ben-Kiki | G06F 40/30 |

FOREIGN PATENT DOCUMENTS

| | | |
|---|---|---|
| CN | 104915356 A | 9/2015 |
| CN | 105354184 A | 2/2016 |
| CN | 105893606 A | 8/2016 |

OTHER PUBLICATIONS

Kumoi et al., "A Note on Documents Classification Using PLSI," The Institute of Electronics, Information and Confirmation Engineers, 2010.

International Search Report for PCT/CN2016/108421, dated Apr. 27, 2017.

Li et al., "Preliminary Design of a Context-Graph-Based Focused Crawler," Computer Engineering vol. 32, No. 12, pp. 226-228, Jun. 2006.

* cited by examiner

METHOD, APPARATUS AND DEVICE FOR RECOGNIZING TEXT TYPE

CROSS-REFERENCE TO RELATED APPLICATION

This is a continuation of International Application PCT/CN2016/108421, with an international filing date of Dec. 2, 2016, which claims priority to Chinese Application No. 201610798213.2, filed on Aug. 31, 2016, entitled "Method, Apparatus and Device for Recognizing Text Type," the contents of which are incorporated herein by reference in their entireties.

TECHNICAL FIELD

The present disclosure relates to the field of computer technology, specifically to the field of Internet technology, and more specifically to a method, apparatus and device for recognizing a text type.

BACKGROUND

The text type recognition may also be referred to as the text classification, which is to determine a type for a document according to a predefined type. The text type recognition is widely applied in many fields. For example, the text type recognition may be applied in the field of classifying a webpage, the field of search engine in which a text inputted by a user needs to be recognized, and the field of classifying original content of the user.

However, the existing text type recognizing methods, for example, a naive bayes method and a support vector machine method, are to derive the type of a text only according to meanings of words in the text. In a situation where the word in the text may be a polysemous word and different words in the text may be synonyms, the accuracy of recognizing the type of the text is decreased. Thus, there is a problem of low accuracy in recognizing the type of the text.

SUMMARY

An objective of the present disclosure is to provide an improved method and apparatus for recognizing a text type, to solve the technical problem menthioned in the above Background section.

In a first aspect, the present disclosure provides a method for recognizing a text type. The method includes: preprocessing a pre-acquired text to obtain a keyword set of the text; calculating an occurrence probability value of each keyword in the keyword set in the text; importing, for the each keyword in the keyword set, the keyword and the occurrence probability value corresponding to the keyword into a pre-established document topic generation model, and determining an occurrence probability value of each topic in the text preset in the document topic generation model, the document topic generation model being used to represent a corresponding relationship between the occurrence probability value of the each topic in the text and both the occurrence probability value of the word in the text and a pre-acquired occurrence probability value of the word in the each topic; and recognizing a type to which the text belongs based on the occurrence probability value of the each topic in the text.

In a second aspect, the present disclosure provides an apparatus for recognizing a text type. The apparatus includes: a preprocessing module, configured to preprocess a pre-acquired text to obtain a keyword set of the text; a calculating module, configured to calculate an occurrence probability value of each keyword in the keyword set in the text; a determining module, configured to import, for the each keyword in the keyword set, the keyword and the occurrence probability value corresponding to the keyword into a pre-established document topic generation model, and determine an occurrence probability value of each topic in the text preset in the document topic generation model, the document topic generation model being used to represent a corresponding relationship between the occurrence probability value of the each topic in the text and both the occurrence probability value of the word in the text and a pre-acquired occurrence probability value of the word in the each topic; and a recognizing module, configured to recognize a type to which the text belongs based on the occurrence probability value of the each topic in the text.

In a third aspect, the present disclosure provides a device. The device includes: one or more processors; and a storage device, configured to store one or more programs. The one or more programs, when executed by the one or more processors, cause the one or more processors to implement the method.

In a fourth aspect, the present disclosure provides a non-volatile computer storage medium, storing a computer readable instruction that can be executed by a processor. When executing the computer readable instruction, the processor performs the method.

According to the method and apparatus for recognizing a text type and the device provided by the present disclosure, the keyword set of the text is first extracted. Then, the occurrence probability value of the each keyword in the keyword set is calculated. Next, based on the occurrence probability value of the word in the text and the pre-acquired occurrence probability value of the word in the each topic, the occurrence probability value of the each topic in the text is obtained using the pre-established document topic generation model. Finally, the type to which the text belongs is recognized based on the occurrence probability value of the each topic in the text. Accordingly, the accuracy of recognizing the type of the text is improved.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
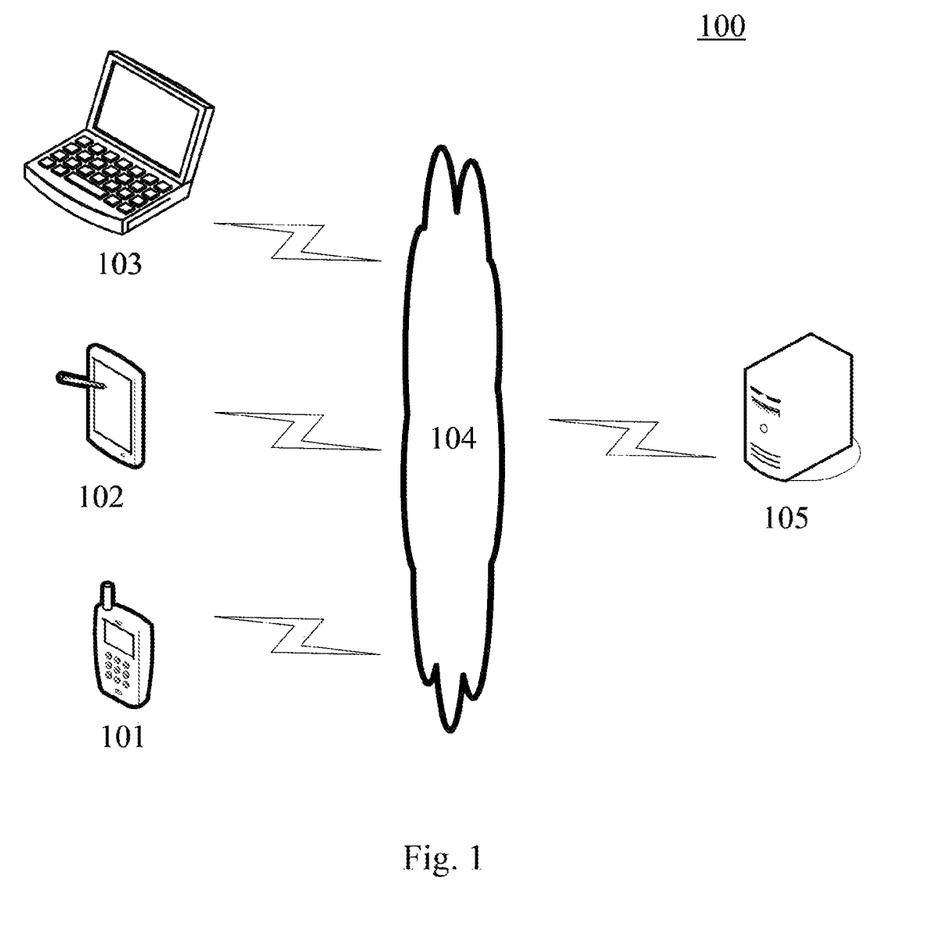
FIG. 1 illustrates an architecture diagram of an exemplary system in which the present disclosure may be implemented.

FIG. 1 shows an architecture of an exemplary system 100 which may be used by a method for recognizing a text type or an apparatus for recognizing a text type according to embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103, and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various client applications, such as review applications, webpage browser applications, shopping applications, search applications, instant messaging tools, mailbox clients, and social platform software may be installed on the terminal devices 101, 102 or 103.

The terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop computers, and desktop computers.

The server 105 may be a server providing various services, for example, a backend server providing support for comment pages displayed on the terminal devices 101, 102 or 103. The backend server may perform processing such as analyzing on data such as received text, and return a processing result (for example, a type to which the text belongs) to the terminal devices.

It should be noted that the method for recognizing a text type according to the embodiments of the present disclosure is generally executed by the terminal devices 101, 102 or 103. Accordingly, the apparatus for recognizing a text type is generally installed on the terminal devices 101, 102 or 103.

It should be appreciated that the numbers of the terminal devices, the networks and the servers in FIG. 1 are merely illustrative. Any number of terminal devices, networks and servers may be provided based on the actual requirements.

Figure 2:
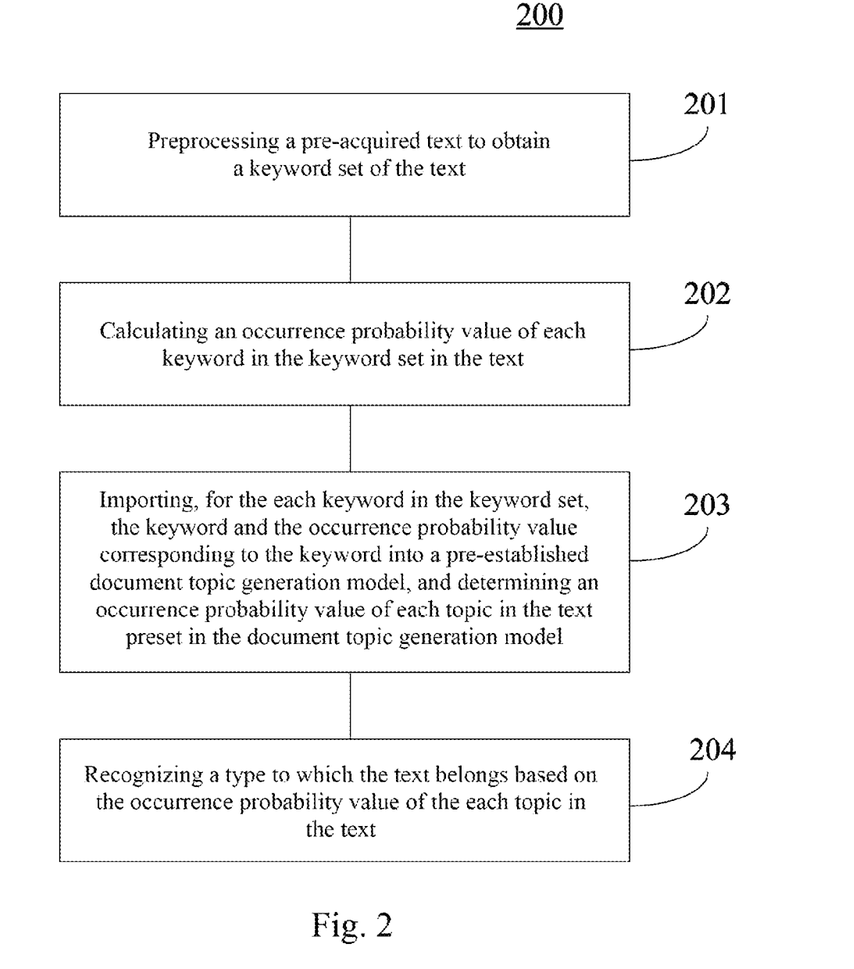
FIG. 2 is a flowchart of an embodiment of a method for recognizing a text type according to the present disclosure.

Further referring to FIG. 2, FIG. 2 illustrates a flow 200 of an embodiment of a method for recognizing a text type according to the present disclosure. The method for recognizing a text type includes the following steps.

Step 201, preprocessing a pre-acquired text to obtain a keyword set of the text.

In this embodiment, an electronic device (e.g., the server as illustrated in FIG. 1) on which the method for recognizing a text type is performed may first acquire the text from a terminal device, then preprocess the text, and finally obtain the keyword set of the text. In such case, the electronic device may also acquire the text from a storage device pre-storing texts.

In some alternative implementations of this embodiment, the text may be a search text inputted by a user in a search box of a search application, a comment text published by the user in a news webpage of a webpage browsing application, an evaluation text on a commodity that is published by the user in a shopping application, or a comment text on a seller, website, service or the like that is published by the user in a review application.

In some alternative implementations of this embodiment, the preprocessing on the text may include: removing a special symbol in the text; performing word segmentation on the text after the special symbol is removed, to obtain a word set; and removing a stop word in the word set to obtain the keyword set. Here, the special symbol in the text may be a punctuation mark, a website link, a number, or the like. Here, a basic granularity may be selected as the granularity of the word segmentation performed on the text. How to perform the word segmentation on the text is well known by those skilled in the art, which will be not repeatedly described herein. In such case, the stop word may be manually defined and pre-stored in a stop word set. For example, a modal particle, or a conjunction may be defined as the stop word.

In some alternative implementations of this embodiment, the preprocessing on the text may include: calculating and removing a special symbol in the text; performing word segmentation on the text after the special symbol is removed, to obtain the word set; removing a stop word in the word set to obtain an initial keyword set; calculating a term frequency-inverse document frequency (TF-IDF) of each initial keyword in the initial keyword set; and selecting an initial keyword having a term frequency-inverse document frequency greater than a predefined threshold as a keyword of the text, and generating the keyword set.

Step 202, calculating an occurrence probability value of each keyword in the keyword set in the text.

In this embodiment, the electronic device may calculate the occurrence probability value of the each keyword in the keyword set in the text.

In some alternative implementations of this embodiment, the occurrence probability value of the keyword may be a ratio of an occurrence frequency of the keyword in the text to a total number of words in the text.

In some alternative implementations of this embodiment, the occurrence probability value of the keyword may be a ratio of the occurrence frequency of the keyword in the text to a number of keywords in the keyword set of the text.

Step 203, importing, for the each keyword in the keyword set, the keyword and the occurrence probability value corresponding to the keyword into a pre-established document topic generation model, and determining an occurrence probability value of each topic in the text preset in the document topic generation model.

In this embodiment, for the each keyword in the keyword set, the electronic device may import the keyword and the occurrence probability value corresponding to the keyword into the pre-established document topic generation model, and determine the occurrence probability value of the each topic in the text preset in the document topic generation model.

In this embodiment, the document topic generation model is used to represent a corresponding relationship between the occurrence probability value of the each topic in the text and both the occurrence probability value of the word in the text and a pre-acquired occurrence probability value of the word in the each topic.

It may be understood by those skilled in the art that the principle of the document topic generation model may be expressed by the following formula:

$$p(x|z) = \sum_{i=1}^{n} p(x|y_i) * p(y_i|z).$$

Here, x represents the word, $y_i$ represents the $i^{th}$ topic, z represents the document, p(x|z) represents the occurrence probability value of the word in the document, $p(x|y_i)$ represents the occurrence probability value of the word in the $i^{th}$ topic, * represents a multiplication sign, and n represents the number of topics included in the document.

As an example, when generating a document, a probability of selecting the word A may be obtained through following processes. A to-be-generated document may involve three topics (topic A, topic B, and topic C). Values of probabilities of selecting the three topics to generate the document are P (topic A|document)=50%, P (topic B|document)=30%, and P (topic C|document)=20% respectively. Occurrence probability values of the word A in the topics are P (word A|topic A)=20%, P (word A|topic B)=10%, and P (word A|topic C)=0% respectively. The occurrence probability value of the word A in the to-be-generated document may be derived as P (word A|document)=P (topic A|document)*P (word A|topic A)+P (topic B|document)*P (word A|topic B)+P (topic C|document)*P (word A|topic C)=50%*20%+30%*10%+20%*0%=0.13.

For any document, p(x|y) is known. The process of establishing the document topic generation model is that $p(x|y_i)$ and $p(y_i|z)$, are derived by training through a large number of documents. As an example, the process of establishing the document topic generation model may be as follows. First, a large number of pre-collected documents are used as a training set. Then, a number of topics is determined using a perplexity. The documents in the training set are trained to generate the document topic generation model. It may be understood by those skilled in the art that the documents in the training set may be trained using a probabilistic latent semantic analysis (PLSA) or latent dirichlet allocation (LDA) to establish the document topic generation model.

In this embodiment, p(x|z) of the text is obtained through step 203. The occurrence probability value $p(x|y_i)$ of the word in the each topic is obtained through pre-training. The occurrence probability value $p(y_i|z)$ of the each topic in the text may be determined based on p(x|z) and $p(x|y_i)$.

Step 204, recognizing a type to which the text belongs based on the occurrence probability value of the each topic in the text.

In this embodiment, the electronic device may recognize the type to which the text belongs based on the occurrence probability value of the each topic in the text.

In some alternative implementations of this embodiment, there may be multiple types of texts, for example, a first type, a second type, and a third type.

In some alternative implementations of this embodiment, there may be two types of texts, for example, a positive class and a negative class.

In some alternative implementations of this embodiment, a type may be pre-divided for the each topic. The type of the topic corresponds to the type of the text. First, the occurrence probability values of the topics in the text are sorted from large to small. Then, the type of the topic having the largest occurrence probability value is defined as the type to which the text belongs.

As an example, if there are multiple types of texts, for example, a literary type, a sports type, and a financial type. The preset ten topics may be pre-divided into the literary type, the sports type, and the financial type. After the occurrence probability values of the ten topics in the text are obtained in step 203, the occurrence probability values of the ten topics are sorted from large to small. The type of the topic having the largest occurrence probability value is defined as the type to which the text belongs. For example, if the type of the topic having the largest occurrence probability value is the sports type, the sports type is defined as the type of the text. That is, the text belongs to the sports type.

As an example, if there are two types of texts, for example, a positive class and a negative class. The preset ten topics may be pre-divided into the positive class or the negative class. After the occurrence probability values of the ten topics in the text are obtained in step 203, the occurrence probability values of the ten topics are sorted from large to small. The type of the topic having the largest occurrence probability value is determined as the type to which the text belongs. For example, if the type of the topic having the largest occurrence probability value is the positive class, the positive class is defined as the type of the text. That is, the text belongs to the positive class.

Figure 3:
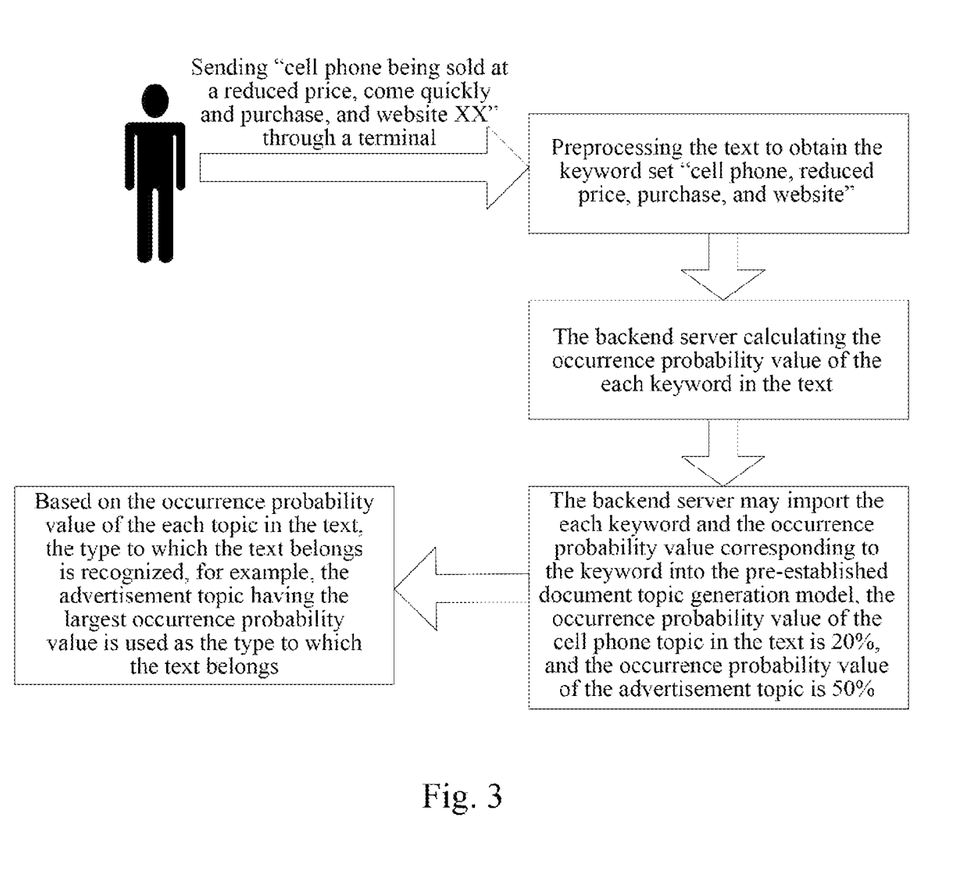
FIG. 3 is a schematic diagram of an application scenario of the method for recognizing a text type according to the present disclosure.

Further referring to FIG. 3, FIG. 3 is a schematic diagram of an application scenario of the method for recognizing a text type according to the embodiment. In the application scenario of FIG. 3, the user first inputs the text "cell phone being sold at a reduced price, come quickly and purchase, and website XX." Then, the backend server may acquire the text in the backend, and preprocess the text to obtain the keyword set "cell phone, reduced price, purchase, and website." Next, the backend server calculates the occurrence probability value of the each keyword in the text. Then, the backend server may import the each keyword and the occurrence probability value corresponding to the keyword into the pre-established document topic generation model to determine the occurrence probability value of the each topic in the text. As an example, the occurrence probability value of the cell phone topic in the text is 20%, and the occurrence probability value of the advertisement topic is 50%. Finally, based on the occurrence probability value of the each topic in the text, the type to which the text belongs is recognized. As an example, the topic having the largest occurrence probability value may be selected as the type of the text. The topic having the largest occurrence probability value in "cell phone being sold at a reduced price, come quickly and purchase, and website XX" is the advertisement topic, and thus, the "advertisement" may be used as the type to which the text belongs.

According to the method provided by the above embodiment of the present disclosure, the keyword set of the text is first extracted. Then, the occurrence probability value of the each keyword in the keyword set is calculated. Next, based on the occurrence probability value of the word in the text and the pre-acquired occurrence probability value of the word in the each topic, the occurrence probability value of the each topic in the text is obtained using the pre-established document topic generation model. Finally, the type to which the text belongs is recognized based on the occurrence probability value of the each topic in the text. Accordingly, the accuracy in recognizing the type of the text is improved.

Figure 4:
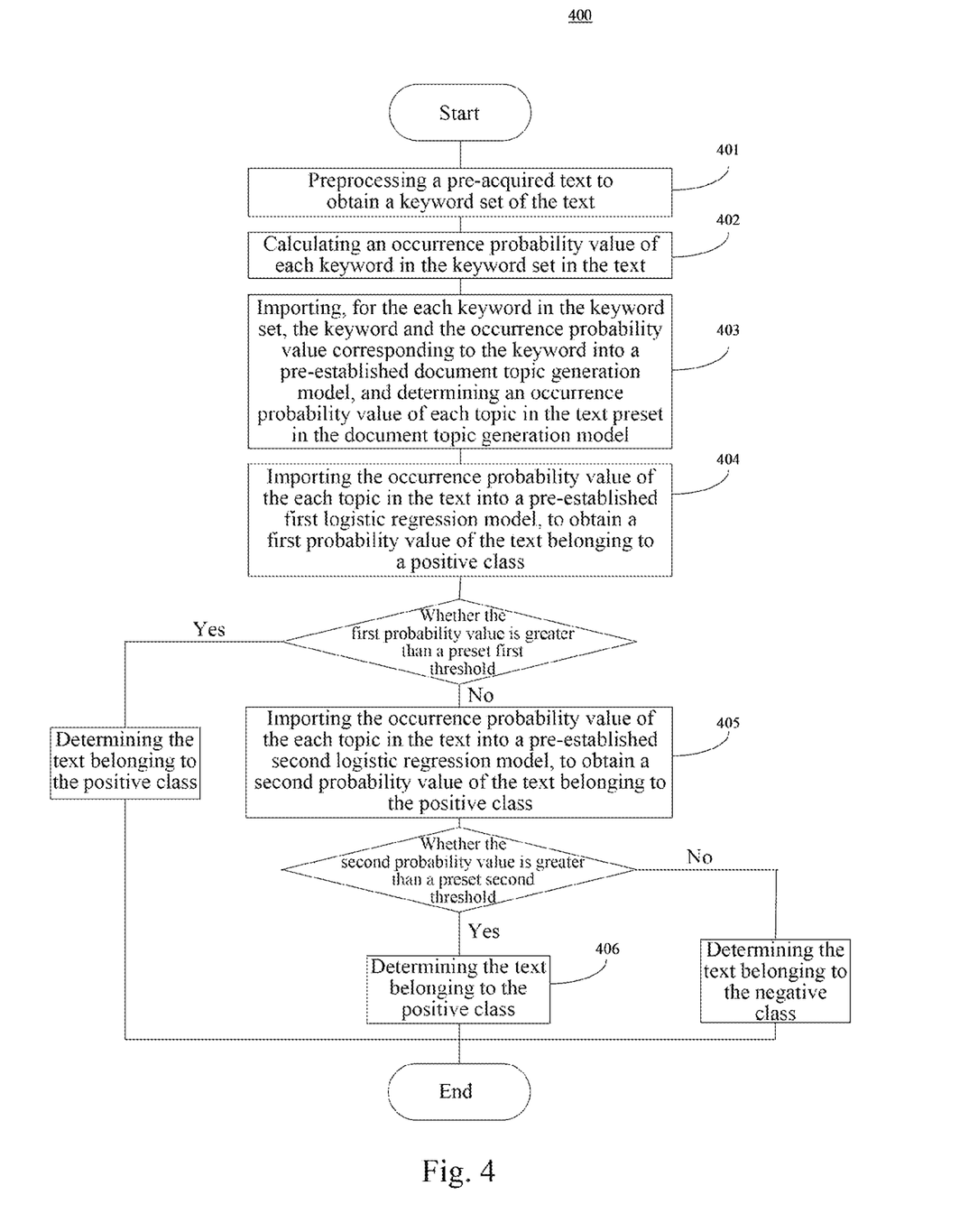
FIG. 4 is a flowchart of another embodiment of the method for recognizing a text type according to the present disclosure.

Further referring to FIG. 4, FIG. 4 illustrates a flow 400 of another embodiment of the method for recognizing a text type. The flow 400 of the method for recognizing a text type includes the following steps.

Step 401, preprocessing a pre-acquired text to obtain a keyword set of the text.

Step 402, calculating an occurrence probability value of each keyword in the keyword set in the text.

Step 403, importing, for the each keyword in the keyword set, the keyword and the occurrence probability value corresponding to the keyword into a pre-established document topic generation model, and determining an occurrence probability value of each topic in the text preset in the document topic generation model.

The operations of the steps 401-403 are substantially the same as that of the steps 201-203, which will not be repeatedly described herein.

Step 404, importing the occurrence probability value of the each topic in the text into a pre-established first logistic regression model, to obtain a first probability value of the text belonging to the positive class.

In this embodiment, the electronic device may import the occurrence probability value of the each topic in the text into the pre-established first logistic regression model, to obtain the first probability value of the text belonging to the positive class. Here, the type includes a positive class and a negative class.

In this embodiment, the first logistic regression model is used to represent a corresponding relationship between the occurrence probability value of the each topic in the text and the first probability value of the text belonging to the positive class.

It may be understood by those skilled in the art that the logistic regression algorithm on which the first logistic regression model is based is a classification algorithm. In the present disclosure, the first logistic regression model may also be replaced with models based on other classification algorithms.

In the present disclosure, the logistic regression model is selected as the classification algorithm. The occurrence probability value of the each topic in the text may be overall analyzed using the logistic regression algorithm, and the calculation is simple and fast. The type to which the text belongs may be recognized in combination with the occurrence probability value of the each topic in the text obtained by the document topic generation model in step 403. When the binary classification is performed on the text, the combination of the document topic generation model and the first logistic regression model may improve the classification efficiency while improving the classification accuracy.

In some alternative implementations of this embodiment, in response to the first probability value being greater than a preset first threshold, it is determined that the text belongs to the positive class.

In some alternative implementations of this embodiment, in the first logistic regression model, a corresponding first regression parameter value is preset for the each topic. The first regression parameter value is used to represent a probability of the each topic belonging to the positive class. First, a product value of the occurrence probability value of the each topic in the text and a regression parameter value corresponding to the topic is calculated. Then, a sum of product values is used as an independent variable of a logistic function to obtain a dependent variable to be used as the first probability value of the text belonging to the positive class. The logistic function is well known by those skilled in the art and will not be repeatedly described herein.

In some alternative implementations of this embodiment, whether the text belongs to the positive class may be recognized based on the first probability value. As an example, in response to the first probability value being greater than the preset threshold, it is determined that the text belongs to the positive class. In response to the first probability value being less than the preset threshold, it is determined that the text belongs to the negative class.

Step 405, importing, in response to the first probability value being less than the preset first threshold, the occurrence probability value of the each topic in the text into a pre-established second logistic regression model, to obtain a second probability value of the text belonging to the positive class.

In this embodiment, in response to the first probability value being less than the preset first threshold, the electronic device may import the occurrence probability value of the each topic in the text into the pre-established second logistic regression model, to obtain the second probability value of the text belonging to the positive class.

In this embodiment, the second logistic regression model is used to represent a corresponding relationship between the occurrence probability value of the each topic in the text and the second probability value of the text belonging to the positive class. A regression parameter of the second logistic regression model is different from the regression parameter of the first logistic regression model. The regression parameter is used to represent a probability of the each topic belonging to the positive class.

In this embodiment, a mechanism for double judgment is set using two different logistic regression models, thereby improving the accuracy of recognizing the type of the text.

It may be understood by those skilled in the art that the logistic regression algorithm on which the second logistic regression model is based is a classification algorithm. In the present disclosure, the second logistic regression model may also be replaced with models based on other classification algorithms In some alternative implementations of this embodiment, in the second logistic regression model, a corresponding second regression parameter value is preset for the each topic. The second regression parameter value is used to represent a probability of the each topic belonging to the positive class.

In some alternative implementations of this embodiment, first, a product value of the occurrence probability value of the each topic in the text and a regression parameter value corresponding to the topic is calculated. Then, a sum of product values is used as an independent variable of a logistic function to obtain a dependent variable of the logistic function to be used as the second probability value of the text belonging to the positive class. The logistic function is well known by those skilled in the art and will not be repeatedly described herein.

Step 406, determining, in response to the second probability value being greater than a preset second threshold, the text belonging to the positive class.

In this embodiment, in response to the second probability value determined in step 405 being greater than the preset second threshold, the electronic device may determine that the text belongs to the positive class.

In some alternative implementations of this embodiment, in response to the second probability value being less than the preset second threshold, it is determined that the text belongs to the negative class.

As may be seen from FIG. 4, compared with the embodiment corresponding to FIG. 2, the flow 400 of the method for recognizing the text type in this embodiment emphasizes the step of operating on the occurrence probability value of the each topic in the text using the doubly-layer logistic regression models, which comprehensively improves the accuracy and efficiency of recognizing the type of the text.

Figure 5:
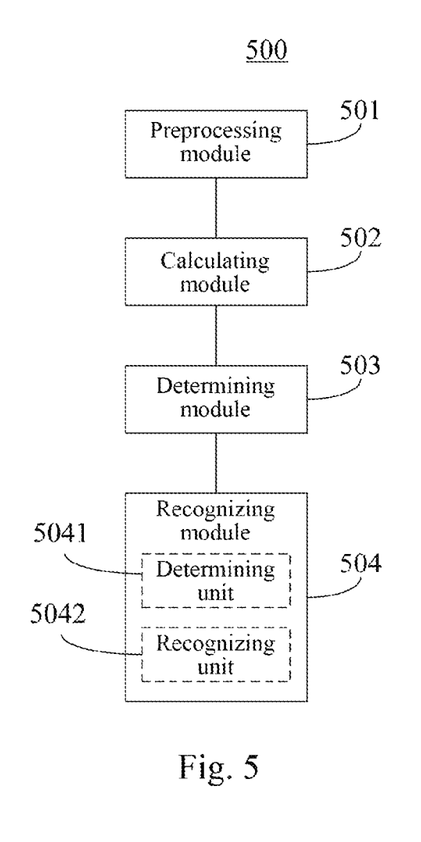
FIG. 5 is a schematic structural diagram of an embodiment of an apparatus for recognizing a text type according to the present disclosure.

Further referring to FIG. 5, as an implementation of the method shown in the above figures, the present disclosure provides an embodiment of an apparatus for recognizing a text type. The embodiment of the apparatus corresponds to the embodiment of the method illustrated in FIG. 2, and the apparatus may be applied in various electronic devices.

As shown in FIG. 5, the apparatus 500 for recognizing a text type according to this embodiment includes: a preprocessing module 501, a calculating module 502, a determining module 503, and a recognizing module 504. The preprocessing module 501 is configured to preprocess a pre-acquired text to obtain a keyword set of the text. The calculating module 502 is configured to calculate an occurrence probability value of each keyword in the keyword set in the text. The determining module 503 is configured to import, for the each keyword in the keyword set, the keyword and the occurrence probability value corresponding to the keyword into a pre-established document topic generation model, and determine an occurrence probability value of each topic in the text preset in the document topic generation model. The document topic generation model is used to represent a corresponding relationship between the occurrence probability value of the each topic in the text and both the occurrence probability value of the word in the text and a pre-acquired occurrence probability value of the word in the each topic. The recognizing module 504 is configured to recognize a type to which the text belongs based on the occurrence probability value of the each topic in the text.

In this embodiment, the preprocessing module 501 in the apparatus 500 for recognizing a text type may first acquire the text from a terminal device, then preprocess the text, and finally obtain the keyword set of the text. In such case, the electronic device may also acquire the text from a storage device pre-storing texts.

In this embodiment, the calculating module 502 calculates the occurrence probability value of the each keyword in the keyword set in the text.

In this embodiment, for the each keyword in the keyword set, the determining module 503 may import the keyword and the occurrence probability value corresponding to the keyword into the pre-established document topic generation model, and determine the occurrence probability value of the each topic in the text preset in the document topic generation model.

In this embodiment, the recognizing module 504 may recognize the type to which the text belongs based on the occurrence probability value of the each topic in the text In some alternative implementations of this embodiment, the type includes a positive class and a negative class. The recognizing module 504 includes: a determining unit 5401, configured to import the occurrence probability value of the each topic in the text into a pre-established first logistic regression model, to obtain a first probability value of the text belonging to the positive class, wherein the first logistic regression model is used to represent a corresponding relationship between the occurrence probability value of the each topic in the text and the first probability value of the text belonging to the positive class; and a recognizing unit 5042, configured to recognize whether the text belongs to the positive class based on the first probability value.

In some alternative implementations of this embodiment, the recognizing unit is further configured to: import, in response to the first probability value being less than a preset first threshold, the occurrence probability value of the each topic in the text into a pre-established second logistic regression model, to obtain a second probability value of the text belonging to the positive class, wherein the second logistic regression model is used to represent a corresponding relationship between the occurrence probability value of the each topic in the text and the second probability value of the text belonging to the positive class, and a regression parameter of the second logistic regression model is different from a regression parameter of the first logistic regression model; and determine, in response to the second probability value being greater than a preset second threshold, the text belonging to the positive class.

In some alternative implementations of this embodiment, the recognizing module is further configured to: determine, in response to the first probability value being greater than the preset first threshold, the text belonging to the positive class.

In some alternative implementations of this embodiment, the recognizing unit is further configured to determine, in response to the second probability value being less than the preset second threshold, the text belonging to the negative class.

In some alternative implementations of this embodiment, the preprocessing module is further configured to: remove a special symbol in the text; perform word segmentation on the text after the special symbol is removed, to obtain a word set; and remove a stop word in the word set to obtain the keyword set.

In the apparatus provided by the embodiment of the present disclosure, the preprocessing module 501 first extracts the keyword set of the text. Then, the calculating module 502 calculates the occurrence probability value of the each keyword in the keyword set. Next, based on the occurrence probability value of the word in the text and the pre-acquired occurrence probability value of the word in the each topic, the determining module 503 obtains the occurrence probability value of the each topic in the text using the pre-established document topic generation model. Finally, based on the occurrence probability value of the each topic in the text, the recognizing module 504 recognizes the type to which the text belongs. Accordingly, the accuracy of recognizing the type of the text is improved.

Figure 6:
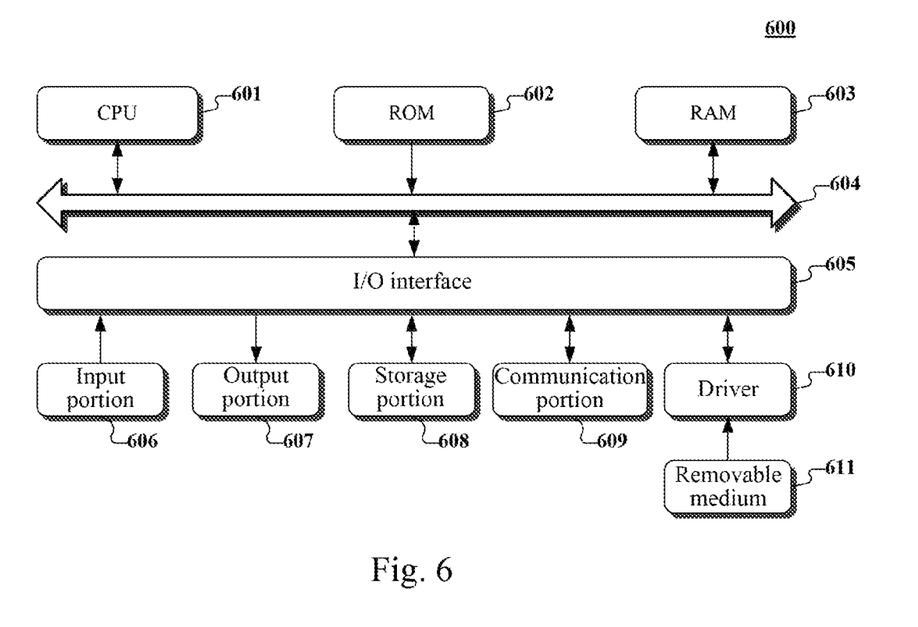
FIG. 6 is a schematic structural diagram of a computer system adapted to implement a server according to embodiments of the present disclosure.

Referring to FIG. 6, a structural schematic diagram of a computer system 600 adapted to implement a server of embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a preprocessing module, a calculating module, a determining module and a recognizing module, where the names of these units do not in some cases constitute a limitation to such units themselves. For example, the preprocessing module may also be described as "a module for preprocessing a pre-acquired text to obtain a keyword set of the text."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the terminal. The non-volatile computer storage medium stores one or more programs. The one or more programs, when executed by a device, cause the device to: preprocessing a pre-acquired text to obtain a keyword set of the text; calculating an occurrence probability value of each keyword in the keyword set in the text; importing, for the each keyword in the keyword set, the keyword and the occurrence probability value corresponding to the keyword into a pre-established document topic generation model, and determining an occurrence probability value of each topic in the text preset in the document topic generation model, the document topic generation model being used to represent a corresponding relationship between the occurrence probability value of the each topic in the text and both the occurrence probability value of the word in the text and a pre-acquired occurrence probability value of the word in the each topic; and recognizing a type to which the text belongs based on the occurrence probability value of the each topic in the text.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a text type, comprising:
preprocessing a pre-acquired text to obtain a keyword set of the text;
calculating an occurrence probability value of each keyword in the keyword set in the text, the occurrence probability value of the keyword being a ratio of an occurrence frequency of the keyword in the text to a total number of words in the text, or a ratio of the occurrence frequency of the keyword in the text to a number of keywords in the keyword set of the text;
importing, for the each keyword in the keyword set, the keyword and the occurrence probability value corresponding to the keyword into a pre-established document topic generation model, and determining an occurrence probability value of each topic in the text preset in the document topic generation model, the document topic generation model being used to represent a corresponding relationship between the occurrence probability value of the each topic in the text and both the occurrence probability value of the keyword in the text and a pre-acquired occurrence probability value of the keyword in the each topic, wherein the occurrence probability value of the keyword in the text equals to a sum of each product of the occurrence probability value of the each topic in the text and the occurrence probability value of the keyword in the each topic; and
recognizing a type to which the text belongs based on the occurrence probability value of the each topic in the text, comprising: defining a type of the topic having a largest occurrence probability value as the type to which the text belongs,
wherein the type includes a positive class and a negative class; and
the recognizing a type to which the text belongs based on the occurrence probability value of the each topic in the text comprises:
importing the occurrence probability value of the each topic in the text into a pre-established first logistic regression model, to obtain a first probability value of the text belonging to the positive class, wherein the first logistic regression model is used to represent a corresponding relationship between the occurrence probability value of the each topic in the text and the first probability value of the text belonging to the positive class; and recognizing whether the text belongs to the positive class based on the first probability value.

2. The method according to claim 1, wherein the recognizing whether the text belongs to the positive class based on the first probability value comprises:

importing, in response to the first probability value being less than a preset first threshold, the occurrence probability value of the each topic in the text into a pre-established second logistic regression model, to obtain a second probability value of the text belonging to the positive class, wherein the second logistic regression model is used to represent a corresponding relationship between the occurrence probability value of the each topic in the text and the second probability value of the text belonging to the positive class, a regression parameter of the second logistic regression model is different from a regression parameter of the first logistic regression model, and the regression parameter is used to represent a probability of the each topic belonging to the positive class; and determining, in response to the second probability value being greater than a preset second threshold, the text belonging to the positive class.

3. The method according to claim 2, wherein the recognizing whether the text belongs to the positive class based on the first probability value further comprises:

determining, in response to the second probability value being less than the preset second threshold, the text belonging to the negative class.

4. The method according to claim 1, wherein the recognizing whether the text belongs to the positive class based on the first probability value further comprises:

determining, in response to the first probability value being greater than the preset first threshold, the text belonging to the positive class.

5. The method according to claim 1, wherein the preprocessing a pre-acquired text to obtain a keyword set of the text comprises:

removing a special symbol in the text;

performing word segmentation on the text after the special symbol is removed, to obtain a word set; and removing a stop word in the word set to obtain the keyword set.

6. An apparatus for recognizing a text type, comprising: at least one processor; and a memory storing instructions, the instructions when executed by the at least one processor, cause the at least one processor to perform operations, the operations comprising:

preprocessing a pre-acquired text to obtain a keyword set of the text;

calculating an occurrence probability value of each keyword in the keyword set in the text, the occurrence probability value of the keyword being a ratio of an occurrence frequency of the keyword in the text to a total number of words in the text, or a ratio of the occurrence frequency of the keyword in the text to a number of keywords in the keyword set of the text;

importing, for the each keyword in the keyword set, the keyword and the occurrence probability value corresponding to the keyword into a pre-established document topic generation model, and determining an occurrence probability value of each topic in the text preset in the document topic generation model, the document topic generation model being used to represent a corresponding relationship between the occurrence probability value of the each topic in the text and both the occurrence probability value of the keyword in the text and a pre-acquired occurrence probability value of the keyword in the each topic, wherein the occurrence probability value of the keyword in the text equals to a sum of each product of the occurrence probability value of the each topic in the text and the occurrence probability value of the keyword in the each topic; and recognizing a type to which the text belongs based on the occurrence probability value of the each topic in the text, comprising: defining a type of the topic having a largest occurrence probability value as the type to which the text belongs, wherein the type includes a positive class and a negative class; and the recognizing a type to which the text belongs based on the occurrence probability value of the each topic in the text comprises:

importing the occurrence probability value of the each topic in the text into a pre-established first logistic regression model, to obtain a first probability value of the text belonging to the positive class, wherein the first logistic regression model is used to represent a corresponding relationship between the occurrence probability value of the each topic in the text and the first probability value of the text belonging to the positive class; and recognizing whether the text belongs to the positive class based on the first probability value.

7. The apparatus according to claim 6, wherein the recognizing whether the text belongs to the positive class based on the first probability value comprises:

importing, in response to the first probability value being less than a preset first threshold, the occurrence probability value of the each topic in the text into a pre-established second logistic regression model, to obtain a second probability value of the text belonging to the positive class, wherein the second logistic regression model is used to represent a corresponding relationship between the occurrence probability value of the each topic in the text and the second probability value of the text belonging to the positive class, a regression parameter of the second logistic regression model is different from a regression parameter of the first logistic regression model, and the regression parameter is used to represent a probability of the each topic belonging to the positive class; and determining, in response to the second probability value being greater than a preset second threshold, the text belonging to the positive class.

8. The apparatus according to claim 7, wherein the recognizing whether the text belongs to the positive class based on the first probability value further comprises:

determining, in response to the second probability value being less than the preset second threshold, the text belonging to the negative class.

9. The apparatus according to claim 6, wherein the recognizing whether the text belongs to the positive class based on the first probability value further comprises:

determining, in response to the first probability value being greater than the preset first threshold, the text belonging to the positive class.

10. The apparatus according to claim 6, wherein the preprocessing module is further configured to:
   removing a special symbol in the text;
   performing word segmentation on the text after the special symbol is removed, to obtain a word set; and
   removing a stop word in the word set to obtain the keyword set.

11. A non-transitory computer storage medium storing a computer program, the computer program when executed by one or more processors, causes the one or more processors to perform operations, the operations comprising:
   preprocessing a pre-acquired text to obtain a keyword set of the text;
   calculating an occurrence probability value of each keyword in the keyword set in the text, the occurrence probability value of the keyword being a ratio of an occurrence frequency of the keyword in the text to a total number of words in the text, or a ratio of the occurrence frequency of the keyword in the text to a number of keywords in the keyword set of the text;
   importing, for the each keyword in the keyword set, the keyword and the occurrence probability value corresponding to the keyword into a pre-established document topic generation model, and determining an occurrence probability value of each topic in the text preset in the document topic generation model, the document topic generation model being used to represent a corresponding relationship between the occurrence probability value of the each topic in the text and both the occurrence probability value of the keyword in the text and a pre-acquired occurrence probability value of the keyword in the each topic, wherein the occurrence probability value of the keyword in the text equals to a sum of each product of the occurrence probability value of the each topic in the text and the occurrence probability value of the keyword in the each topic; and
   recognizing a type to which the text belongs based on the occurrence probability value of the each topic in the text, comprising: defining a type of the topic having a largest occurrence probability value as the type to which the text belongs;
   wherein the type includes a positive class and a negative class; and
   the recognizing a type to which the text belongs based on the occurrence probability value of the each topic in the text comprises:
   importing the occurrence probability value of the each topic in the text into a pre-established first logistic regression model, to obtain a first probability value of the text belonging to the positive class, wherein the first logistic regression model is used to represent a corresponding relationship between the occurrence probability value of the each topic in the text and the first probability value of the text belonging to the positive class; and
   recognizing whether the text belongs to the positive class based on the first probability value.

* * * * *